United States Patent [19]

Gasseling et al.

[11] Patent Number: 4,862,685
[45] Date of Patent: Sep. 5, 1989

[54] HAY WINDROW FLUFFER

[76] Inventors: Allen J. Gasseling; Kevin D. Gasseling; Joe A. Gasseling, all of P.O. Box 37, Moxee City, Wash. 98936

[21] Appl. No.: 526,434

[22] Filed: Aug. 25, 1983

[51] Int. Cl.⁴ .............................................. A01D 82/00
[52] U.S. Cl. ........................................ 56/372; 56/164; 56/DIG. 2
[58] Field of Search .................. 56/1, 14.8, 15.8, 16.4, 56/364, 372, DIG. 1

[56] References Cited

U.S. PATENT DOCUMENTS

| | | | |
|---|---|---|---|
| 2,559,862 | 7/1951 | Ferguson | 56/372 |
| 3,043,073 | 7/1962 | Bornzin | 56/DIG. 1 |
| 3,339,352 | 9/1967 | Burrough et al. | 56/DIG. 1 |
| 4,218,865 | 8/1980 | Chaumont et al. | 56/15.8 |
| 4,259,872 | 4/1981 | Chandler | 56/14.8 |

Primary Examiner—Gene Mancene
Assistant Examiner—David L. Tarnoff

[57] ABSTRACT

A support frame is provided for support from the three point hitch of a tractor and rotatably journals an elongated horizontal roll for rotation about an axis extending transversely of the support frame. The support frame includes opposite side ground skid portions and the roll has its lower periphery elevated slightly above the under surfaces of the ground skid portions. Although other structure may be provided for driving the roll, a forwardly directed swing arm is pivotally supported from the support frame at its rear end and rotatably journals a ground engageable drive wheel at its forward end. The roll is journalled for rotation about an axis coinciding with the axis of oscillation of the support arm and the drive wheel is drivingly coupled to the roll for rotating the latter in a direction opposite to the direction of rotation of the drive wheel and at a peripheral speed which is at least substantially equal to the peripheral speed of the ground wheel. The roll includes a roughened outer surface which engages and upwardly deflects the hay against which it is advanced and passes the hay rearwardly over the roll in a manner which does not break up the windrow, which handles the windrow gently and which lightly deposits the windrow upon the stubble projecting above the ground rearward of the roll.

4 Claims, 2 Drawing Sheets

HAY WINDROW FLUFFER

BACKGROUND OF THE INVENTION

When vegetation is cut and windrowed for hay purposes, the initially cut vegetation is heavy because of its moisture content and falls back upon the ground within the stubble remaining as a result of the vegetation cutting operation. Accordingly, the under part of the windrow often rests upon the ground and full drying thereof is extensively delayed. Further, rainfall intermediate the windrowing operation and a hay baling or other hay collecting operation can result in mildew forming on the underside of the windrowed hay. Still further, even though windrowed hay may not have started to mildew, incomplete drying of the lower portion of a windrow of hay can result in that hay becoming mildewed after it is baled.

Accordingly, a need exists for structure by which complete drying of windrowed hay may be accelerated to thereby substantially eliminate any possibility of the hay becoming mildewed before or after baling.

Although various types of hay tedders and other similar types of devices heretofore have been provided to facilitate the complete drying of hay while it lies upon the ground, most of these previously known devices involve rotary tine equipped structures which have at least some tendency to throw, flip or rake the partially dried hay in a manner which tends to break up the initial windrow and to cause partially dried leaves and seeds of the vegetation to fall therefrom. This, of course, not only causes difficulty in picking up the windrow from the ground during a baling operation but also creates additional waste in that many of the partially dried leaves and seeds are separated from the stalks of the hay and thus are lost during the pickup and hay baling operations. Various forms of hay handling devices as well as other mechanisms including some of the general structural and operational features of the instant invention are disclosed in U.S. Pat. Nos. 3,059,403, 3,364,667, 3,474,601, 3,721,080 and 3,731,468.

BRIEF DESCRIPTION OF THE INVENTION

The hay windrow fluffer of the instant invention utilizes a relatively small diameter cylindrical roll having a roughened outer surface and which is approximately 9 inches in diameter. The roll is laterally horizontally advanced along a windrow at an elevation spaced slightly above the ground and rotated at a peripheral speed substantially equal to the linear speed of advancement of the roll along the ground with the roll being driven in a direction with the upper and lower peripheries of the roll moving rearwardly and forwardly, respectively, relative to the direction of lateral advancement of the roll over the ground.

The peripheral portion of the roll facing forwardly is thus moving upwardly and engages and elevates the windrow against which the roll is being advanced over the roll without breaking up the windrow and lightly deposits the windrow back down upon the stubble which projects above the ground in a manner such that the under surfaces of the windrow are substantially entirely elevated above the ground and subject to free air drying.

The roll is approximately 9 inches in diameter although slightly smaller and slightly larger diameter rolls may be used. A roll of appreciably smaller diameter would not be operative inasmuch as it would tend to cut through the windrow and an appreciably larger diameter roll would not be operative inasmuch as such a large diameter roll might have the entire upper half thereof disposed above the upper surface of the windrow to be fluffed and the lower portion of the forward facing side of the roll advanced along a windrow would not be operative to engage and upwardly displace the windrow over the roll.

The main object of this invention is to provide a method and apparatus whereby a partially dried windrow of hay may be lightly picked up from within ground stubble and thereafter deposited back upon the stubble in a manner such that at least substantially all of the under portions of the windrow are elevated above the ground and supported directly from the stubble.

Yet another object of this invention is to provide a method and apparatus in accordance with the immediately preceding object and wherein a windrow may be treated by an apparatus moving therealong at a reasonable ground speed.

Another object of this invention is to provide a windrow fluffer which may be readily adapted to various different forms of prime movers including prime movers which do not include power takeoffs or hydraulic systems.

A still further object of this invention is to provide an apparatus and method which may be used effectively in conjunction with various different windrowed crops.

A final object of this invention to be specifically enumerated herein is to provide an apparatus in accordance with the preceding objects and which will conform to conventional forms of manufacture, be of simple construction and easy to use so as to provide a device that will economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
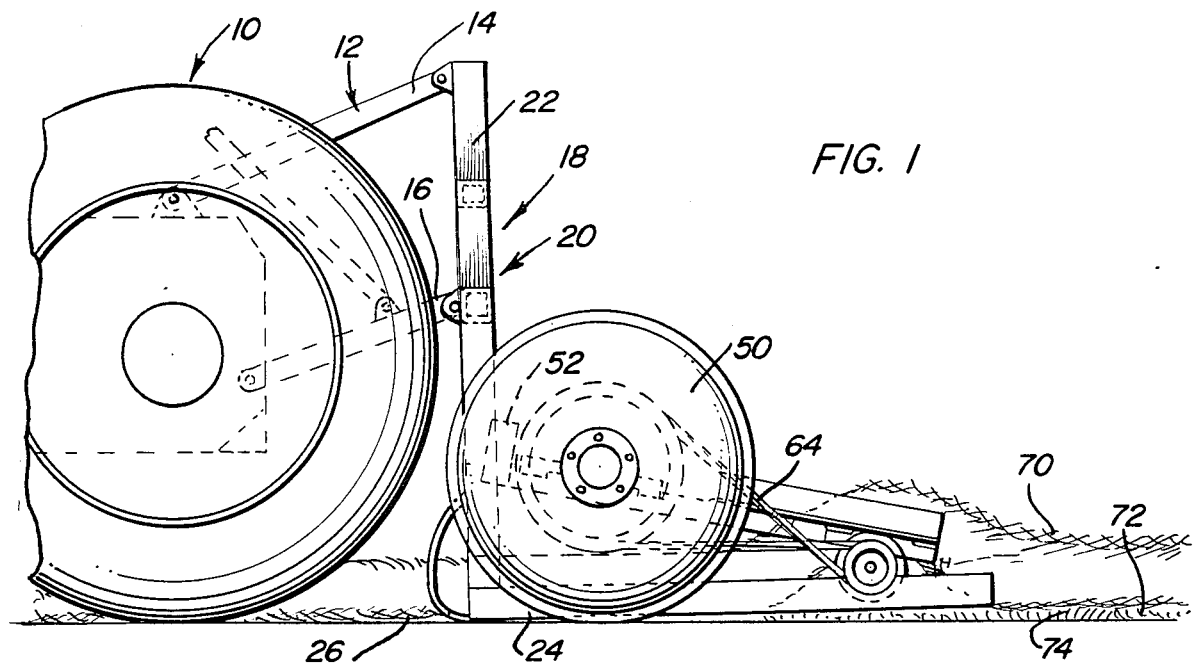
FIG. 1 is a side elevational view of the hay windrow fluffer of the instant invention illustrating the manner in which the windrow fluffer may be mounted from the three point hitch of a farm tractor and further illustrating the manner in which the fluffer is operative to pick up and lightly lay back down the windrow with which it is associated.
Figure 2:
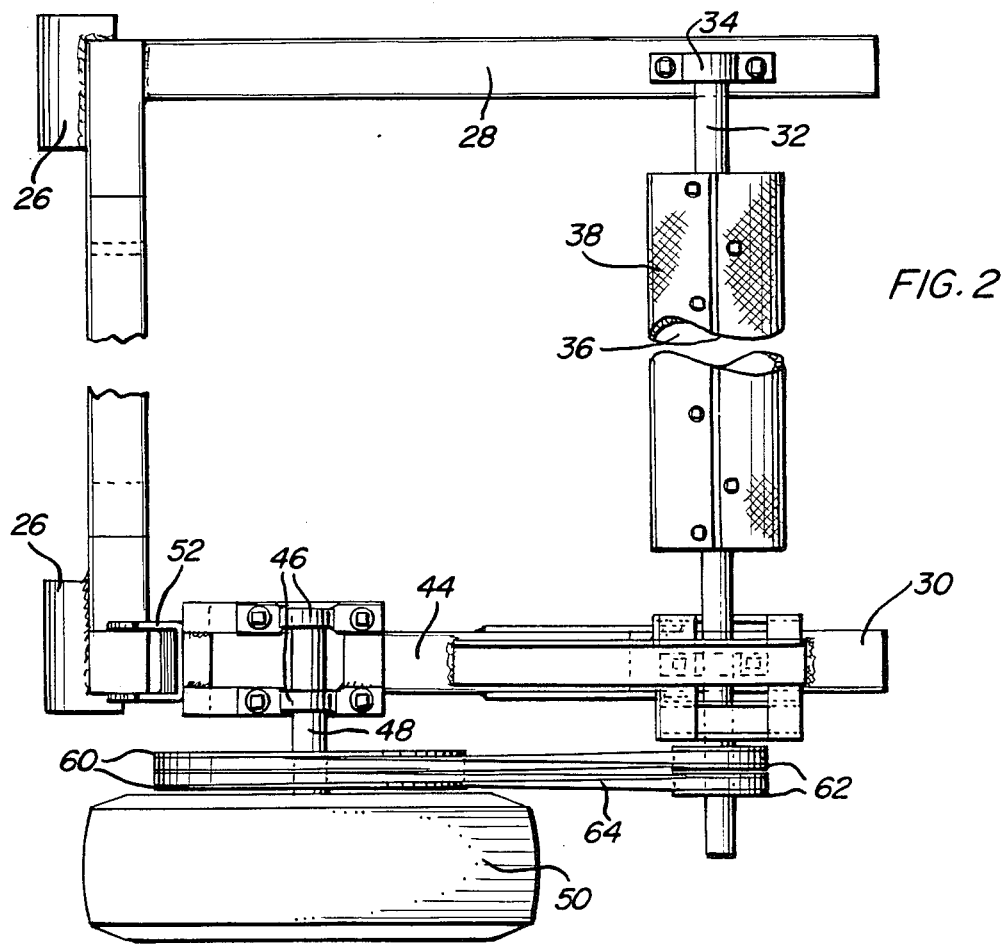
FIG. 2 is a framentary enlarged top plan view of the windrow fluffer.
Figure 3:
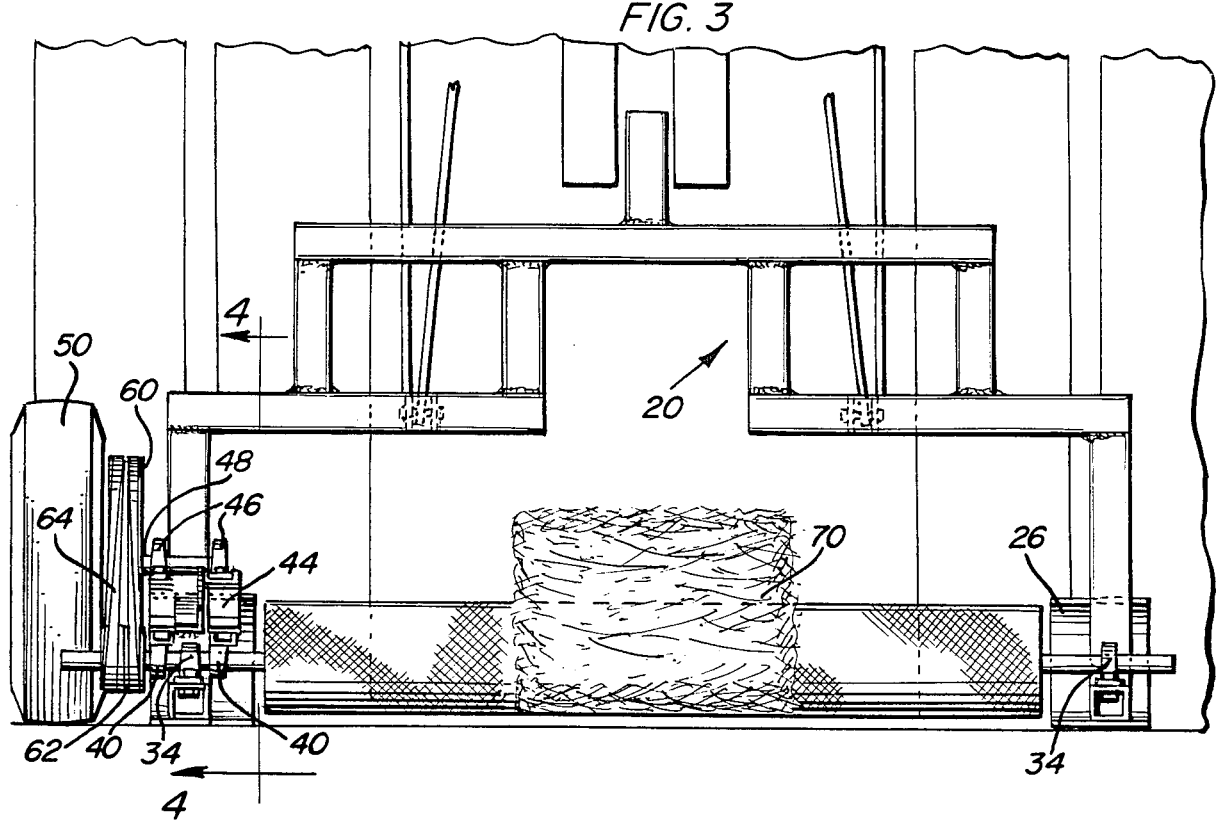
FIG. 3 is a rear elevational view of the windrow fluffer.

Referring now more specifically to the drawings, the numeral 10 generally designates a conventional form of farm tractor including a three point hitch of conventional design and referred to in general by the reference numeral 12. The hitch 12 includes a central upper arm 14 and a pair of opposite side lower arms 16.

The hay windrow fluffer of the instant invention is referred to in general by the reference numeral 18 and includes an L-shaped frame referred to in general by the reference numeral 20. The frame 20 includes an upstanding forward portion 22 and a lower horizontal rearwardly projecting portion 24. The arm 14 is pivotally connected to an upper central portion of the portion 22 and the rar ends of the arms 16 are pivotally connected to opposite side vertical mid-portions of the portion 22.

The lower opposite side portions of the frame portion 22 include arcuate skid plates 26 and the rearwardly projecting portion 24 constitutes a pair of opposite side rearwardly projecting and generally horizontal tubular members 28 and 30.

A horizontal transverse shaft 32 is journaled between the rear ends of the tubular members 28 by a pair of journals or pillow blocks 34 and the mid-portion of the shaft 32 supports a cylindrical roll or roller 36 having a roughened outer coating or surface 38. In addition, a pair of journals or pillow blocks 40 rotatably journal the shaft 32 and are anchored to the underside of a forwardly projecting swing arm 44 whose forward end overlies and is spaced above the tubular member 30. The forward end of the swing arm supports a pair of journals or pillow blocks 46 which rotatably journal a shaft 48 from which a ground engageable drive wheel 50 is supported. The forward end of the swing arm 44 includes an upstanding forwardly opening channel member 52 supported therefrom which guidingly receives an upstanding portion 54 of the frame 20 therein to prevent lateral deflection of the forward end of the swing or support arm 54.

The shaft 48 supports a pair of large diameter pulley wheels 60 therefrom and the shaft 32 supports a pair of small pulley wheels 62 therefrom aligned with the pulley wheels 60. A pair of endless belts 64 are trained about pulley wheels 60 and 62 and twisted therebetween whereby the pulley wheels 62 are driven in a direction opposite from the direction of rotation of the pulley wheels 60.

The drive wheel 50 is approximately 29½ inches in diameter, the pulley wheels 60 are approximately 20 inches in diameter and the roll 36 is approximately 9 inches in diameter, whereas the pulley 62 are approximately 5 inches in diameter.

Each approximately 92 inch advance of the fluffer 18 causes one revolution of the drive wheel 50 and each revolution of the drive wheel 50 causes four revolutions of the roll 36. Accordingly, inasmuch as the roll 36 is approximately 9 inches in diameter, each revolution of the drive wheel 50 results in approximately 113 inches of peripheral advance of the roller 36. Therefore, the peripheral speed of the roller 36 is approximately equal to the ground speed of the fluffer 18.

The arm 40 overlies the tubular member 30 whereby when the fluffer 20 is elevated sufficiently relative to the ground by the three point hitch 12, the forward end of the arm 44 will abut and rest upon the upper surface of the forward end of the tubular member 30 and thus maintain the drive wheel 50 elevated above the ground.

Figure 4:
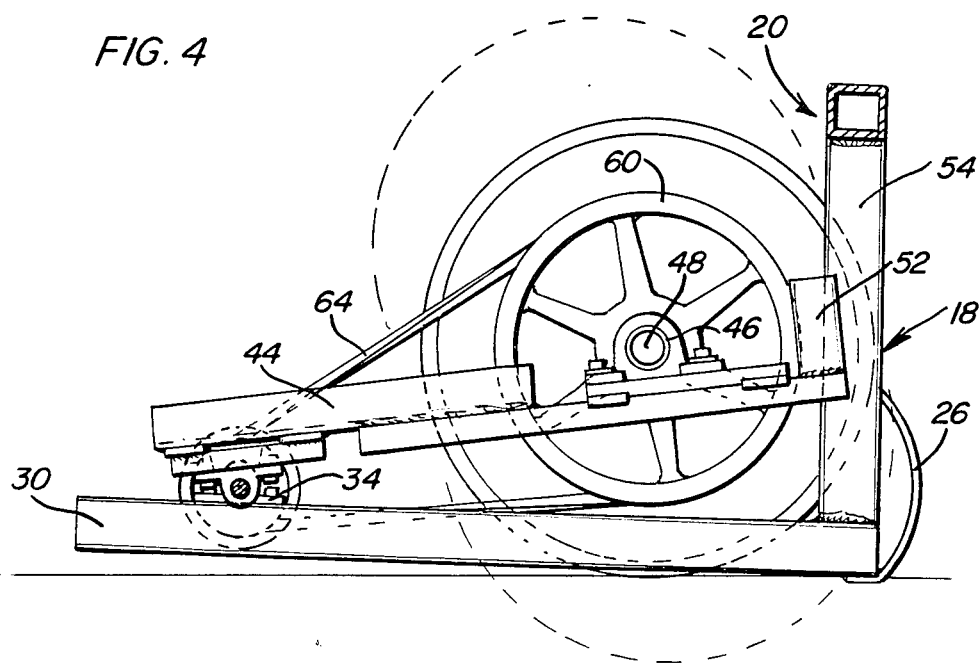
FIG. 4 is an enlarged longitudinal vertical sectional view taken substantially upon the plane indicated by the section line 4—4 of FIG. 3.

When it is desired to fluff a windrow such as the windrow 70 in FIG. 1, the tractor 10 is aligned with the windrow 70 and moved forwardly therealong with the frame 20 lowered to the approximate position thereof illustrated in FIG. 4. As the roll 36 is lowered substantially through the windrow 70, its reverse rotation will enable it to cut through the windrow 70 and cause the windrow to be smoothly elevated upwardly and over the roll 36. In this manner, windrow 70 is lightly picked up from the ground 72 and subsequently lightly deposited back upon the stubble 74 which projects above the ground 72.

As hereinbefore set forth, when newly cut hay is windrowed, it has a high moisture content and the weight thereof causes the hay in the windrow 70 to fall down within the stubble 74 and to rest upon the ground. However, once the windrow 70 has been fluffed and deposited upon the stubble 74, substantially all of the windrow 70 is supported from the stubble in slightly spaced relation relative the ground 72. In this manner, the underside of the windrow 70 is quickly air dried and there is substantially little chance for mildew to form.

Also, it is pointed out that inasmuch as the windrow 70 is gently picked up from within the stubble 74 and thereafter deposited back upon the stubble 74 without breaking the windrow or roughly handling the same, substantially all of the leaves and seeds on the hay within the windrow 70 are retained. In addition, when the windrow is picked up from the field for baling purposes, it is more completely picked up and there is far less loss of leaves, seeds and short pieces of hay remaining on the ground 72.

The frame may be forwardly tilted in order to increase the height of the roller above the ground and the ground wheel rotates the roll 36 as it is lowered close to other upper portion of the windrow 70.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A hay windrow fluffer including a support frame for motive attachment to a ground supported prime mover, a horizontal transverse roll journaled from said frame for rotation about the center longitudinal axis of said roll and for lateral advancement of said roll along a window of vegetation such as hay, legumes and straw which lies partially upon and partially within the stubble left by an initial cutting of said vegetation, and drive means for driving said roll at a peripheral speed at least substantially equal to the linear speed of lateral advancement of said roll along a windrow and with said roll being rotatably driven in a direction with the lower periphery of said roll being advanced in the direction in which said roll is being laterally advanced along said windrow, said frame supporting a front to rear extending swing arm therefrom including base and free ends, said base end of said swing arm being oscillatably supported from said frame for angular displacement about a horizontal tranverse axis, said ground wheel being journaled from the free end of said swing arm, said support frame including a pair of rearwardly projecting opposite side lower horizontal portions, said roll being journaled from the rear end portions of said horizontal portion, said swing arm base end being oscillatably mounted from the rear end of one of said horizontal portions with said swing arm projecting forwardly along and disposed over one horizontal portion, the free end of said swing arm including a portion thereof engageable with said one horizontal portion in order to limit downward swinging movement of said free and relative to said support frame.

2. A hay windrow fluffer including a support frame for motive attachment to a ground supported prime mover, a horizontal transverse roll journaled from said frame for rotation about the center longitudinal axis of said roll and for lateral advancement of said roll along a window of vegetation such as hay, legumes and straw which lies partially upon and partially within the stubble left by an initial cutting of said vegetation, and drive means for driving said roll at a peripheral speed at least substantially equal to the linear speed of lateral advancement of said roll along a windrow and with said roll being rotatably driven in a direction with the lower periphery of said roll being advanced in the direction in which said roll is being laterally advanced along said windrow, said frame supporting a front to rear extending swing arm therefrom including base and free ends, said base end of said swing arm being oscillatably supported from said frame for angular displacement about a horizontal transverse axis, said ground wheel being journaled from the free end of said swing arm, said support frame including a pair of rearwardly projecting opposite side lower horizontal portions, said roll being journaled from the rear end portions of said horizontal portions, said swing arm base end being oscillatbly mounted from the rear end of one of said horizontal portions with said swing arm projecting forwardly along and disposed over one horizontal portion, the free end of said swing arm including a portion thereof engageable with said one horizontal portion in order to limit downward swinging movement of said free end relative to said support frame, the forward ends of said horizontal portions including ground skid members operatively associated therewith.

3. The method of shortening drying time of a windrow of vegetation such as hay, legumes and straw which lies partially upon and partially within the stubble left by initial cutting of the vegetation, said method comprising gently single wave lifting and lowering the windrow, from therebeneath, relative to the ground along a straight horizontally elongated wave zone extending transversely of the windrow and laterally advanced therealong by providing a single elongated horizontal roll of generally nine inches in diameter and free of radially outwardly projecting vegetation layer piercing tine structure but having a rough generally cylindrical outer surface, laterally advancing said roll along a windrow with the roll spaced at least slightly above the ground and non opposed by a second roll while rotating said single roll about its center longitudinal axis at a peripheral speed at least substantially equal to the speed of advancement of the roll along the windrow and with the roll being rotatably driven in a direction with the lower periphery of the roll being advanced in the direction in which the roll is laterally advanced along the windrow, so as to gently elevate the windrow up and rearwardly over said single roll independent of any vertical compression of said windrow and unwanted agitation of the windrow.

4. The method of claim 3 including laterally advancing said roll while the same is mounted from a support frame therefor from which said roll is journaled for rotation about said axis and which is supported from a three point tractor mounted hitch, said frame including an upstanding portion mounted from said hitch and a lower rearwardly projecting portion from whose rear end portion said roll is journaled.

* * * * *